US012565915B2

(12) United States Patent
Langreck

(10) Patent No.: US 12,565,915 B2
(45) Date of Patent: Mar. 3, 2026

(54) PISTON SPRING RETURN ASSEMBLY FOR AUTOMATIC TRANSMISSION

(71) Applicant: Goerend Transmissions, Inc., Saint Lucas, IA (US)

(72) Inventor: Chase Langreck, Saint Lucas, IA (US)

(73) Assignee: Goerend Transmissions, Inc., Saint Lucas, IA (US)

( * ) Notice: Subject to any disclaimer, the term of this patent is extended or adjusted under 35 U.S.C. 154(b) by 10 days.

(21) Appl. No.: 18/444,139

(22) Filed: Feb. 16, 2024

(65) Prior Publication Data

US 2025/0264138 A1     Aug. 21, 2025

(51) Int. Cl.
*F16D 23/12* (2006.01)

(52) U.S. Cl.
CPC ..................................... *F16D 23/12* (2013.01)

(58) Field of Classification Search
CPC .......... F16D 23/12; F16D 13/30; F16D 13/36; F16D 25/12; F16D 13/56
See application file for complete search history.

(56) References Cited

U.S. PATENT DOCUMENTS

| | | | | |
|---|---|---|---|---|
| 5,135,088 | A | * | 8/1992 | Heidenreich ........... F16D 7/025 464/48 |
| 5,306,086 | A | * | 4/1994 | Orlowski ................ F16F 1/128 267/89 |

| | | | | |
|---|---|---|---|---|
| 6,190,258 | B1 | * | 2/2001 | Heidenreich ........... F16D 7/027 464/48 |
| 2013/0334750 | A1 | * | 12/2013 | Fueki ........................ F16F 3/04 267/179 |
| 2014/0110214 | A1 | * | 4/2014 | McFarland ............. F16D 25/12 192/109 F |
| 2017/0023072 | A1 | | 1/2017 | Tanaka |
| 2018/0156283 | A1 | * | 6/2018 | Deneszczuk ........ F16D 25/0638 |
| 2018/0163794 | A1 | * | 6/2018 | Deneszczuk ............ F16D 25/12 |
| 2019/0376574 | A1 | * | 12/2019 | Uematsu ................ F16F 1/128 |

FOREIGN PATENT DOCUMENTS

| | | | | | |
|---|---|---|---|---|---|
| DE | 102015226273 | A1 | * | 6/2017 | ............. F16D 25/12 |

OTHER PUBLICATIONS

Chrysler Return Spring Retaining Ring, 4 pages.

* cited by examiner

*Primary Examiner* — Farhana Pervin
(74) *Attorney, Agent, or Firm* — McKee, Voorhees & Sease, PLC

(57) ABSTRACT

A spring assembly for the clutch of an automatic transmission includes a plurality of springs residing between upper and lower retaining rings which are secured together with a plurality of fasteners. The spring assembly is compressed against the force of the springs when the clutch piston is applied to engage the clutch, and then expanded when the clutch piston is released to disengage the clutch. The fasteners of the spring assembly eliminate radial movement of the rings relative to one another and control the axial movement of either of the upper and lower spring retaining rings.

18 Claims, 11 Drawing Sheets

PISTON SPRING RETURN ASSEMBLY FOR AUTOMATIC TRANSMISSION

TECHNICAL FIELD

The invention is directed toward a spring retainer assembly for use with a clutch piston of an automatic transmission.

BACKGROUND

Conventional automatic transmissions have a clutch which can be engaged and disengaged. A clutch piston moves between the released position wherein the clutch is disengaged and an applied position when the clutch is engaged. A spring assembly surrounding the clutch hub urges the piston to the released position. The factory install spring assembly is retained on the clutch hub by a snap ring. These OEM spring assemblies have upper and lower rings with springs sandwiched between the rings. The upper and lower rings have alternating tabs extending into the springs to prevent rotation of the rings about their central axis. However, the OEM spring assembly does not have any structure to hold the snap ring in place, which sometimes leads to the snap ring popping out. There are aftermarket parts for the factory spring assembly, which is a top ring with a shoulder to retain the snap ring. But these aftermarket upper rings do not have tabs to prevent turning of the rings, which leads to roll over of the springs, which can lead to the clutch failing to properly disengage due to lack of sufficient spring biasing force.

Accordingly, a primary objective of the present invention is the provision of an improved spring retainer assembly for the clutch of an automatic transmission with overcomes the problems of the prior art.

A further objective of the present invention is the provision of a spring retainer assembly for an automatic transmission clutch, wherein the upper and lower rings of the assembly are bolted together to prevent rotation of the rings relative to one another.

Another objective of the present invention is the provision of a spring retainer assembly which includes upper and lower rings with recesses to receive and hold the opposite ends of the springs.

A further objective of the present invention is the provision of a spring retainer assembly for a transmission clutch wherein the springs are held in place without internal structures.

Yet another objective of the present invention is the provision of an automatic transmission having a clutch with an improved spring assembly to return the clutch to a disengaged state.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

SUMMARY

A spring retainer assembly is provided for the clutch of an automatic transmission to bias the clutch to a released state or condition whereby the clutch is disengaged. When the clutch moves to an applied state or condition, the spring retainer assembly is compressed, and the clutch engages. The spring retainer assembly includes a first or upper ring and a second or lower ring, between which a plurality of springs are sandwiched. First and second rings each have a plurality of recesses which receive the opposite ends of each spring, thereby retaining the springs between the rings and assuring that the springs remain properly aligned. The rings are secured together with fasteners, such as shoulder bolts, which allow the lower or bottom ring to move axially toward and away from the stationary upper or top ring, in response to movement of the clutch piston.

DETAILED DESCRIPTION

Figure 1:
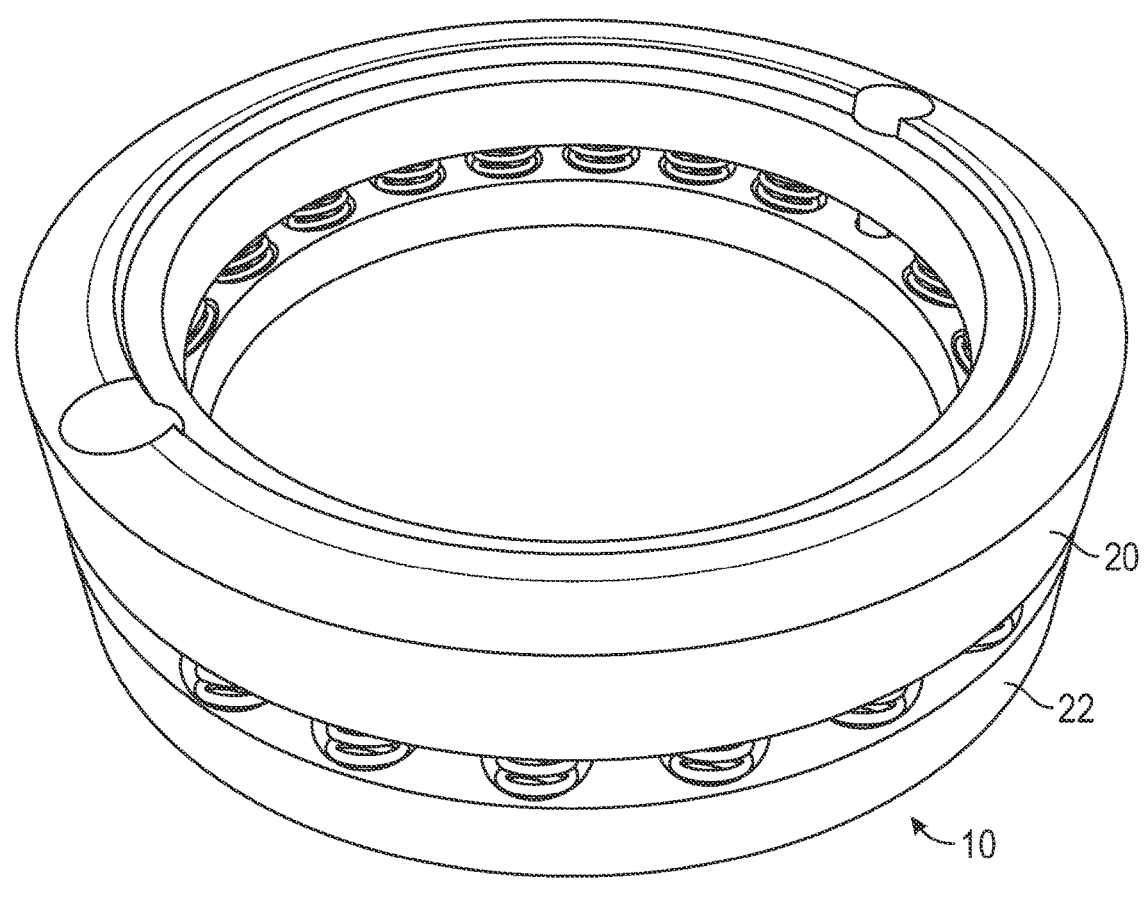
FIG. 1 is a perspective view of the return spring assembly of the present invention.
Figure 2:
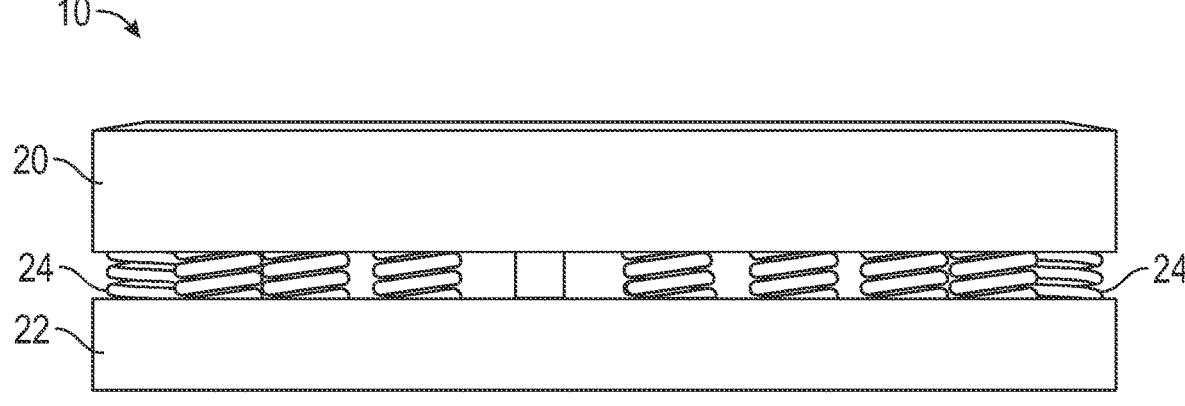
FIG. 2 is a side elevation view of the assembly shown in FIG. 1, with the retainer rings in the maximum spaced apart orientation.

The spring assembly 10 is intended for use with the clutch of an automatic transmission to urge the clutch piston from an applied state wherein the clutch is engaged to a released state wherein the clutch is disengaged. The spring assembly 10 resides around the inside the clutch housing 11, as shown in FIGS. 8-11. One end of the spring retainer assembly 10 engages the clutch piston 14, with the clutch plates 16 extending around the spring retainer assembly 10. A retaining ring 18 secures the spring retainer assembly 10 to the clutch housing 11.

Figure 3:
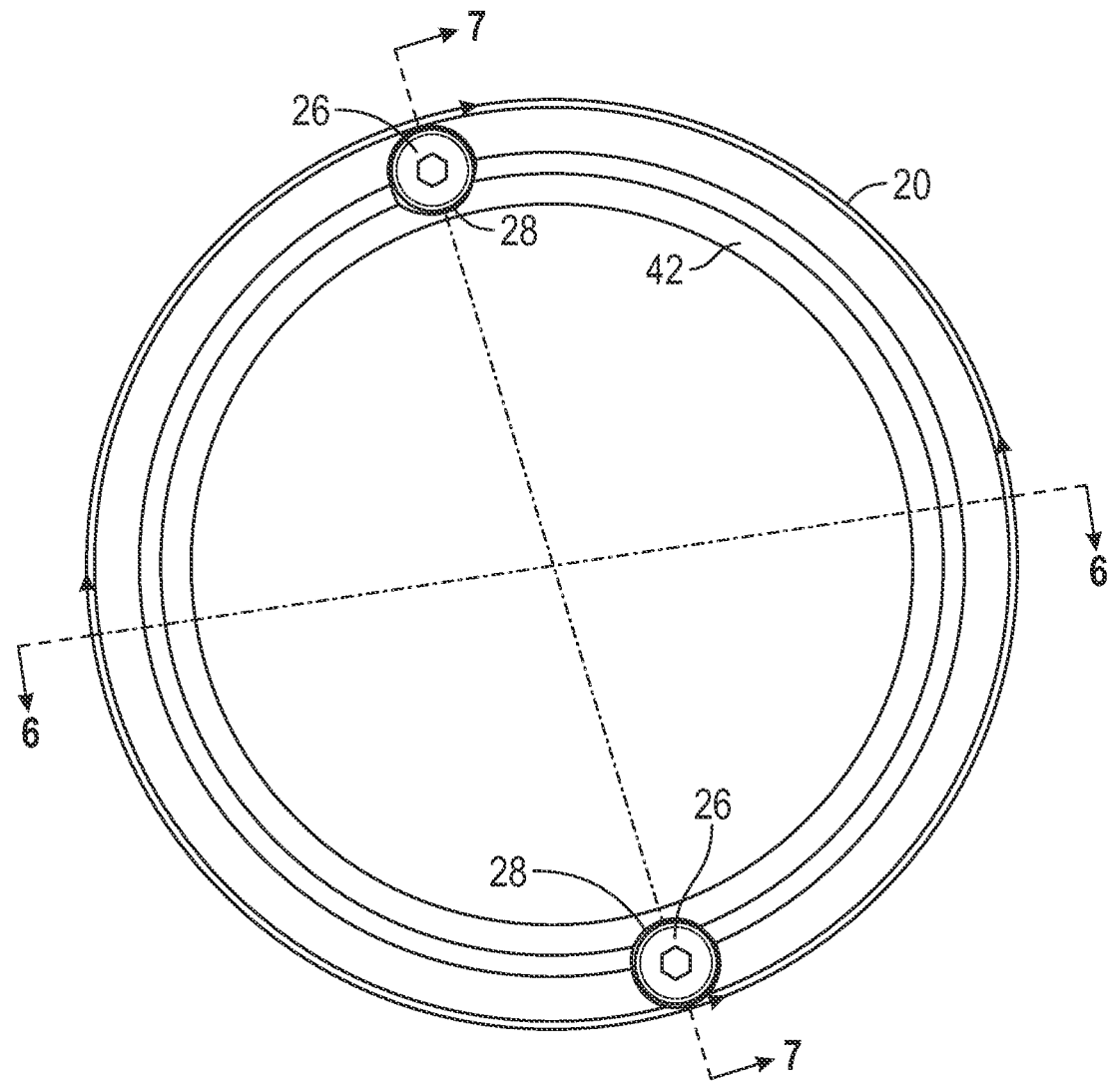
FIG. 3 is a top plan view of the assembly shown in FIG. 1.
Figure 4:
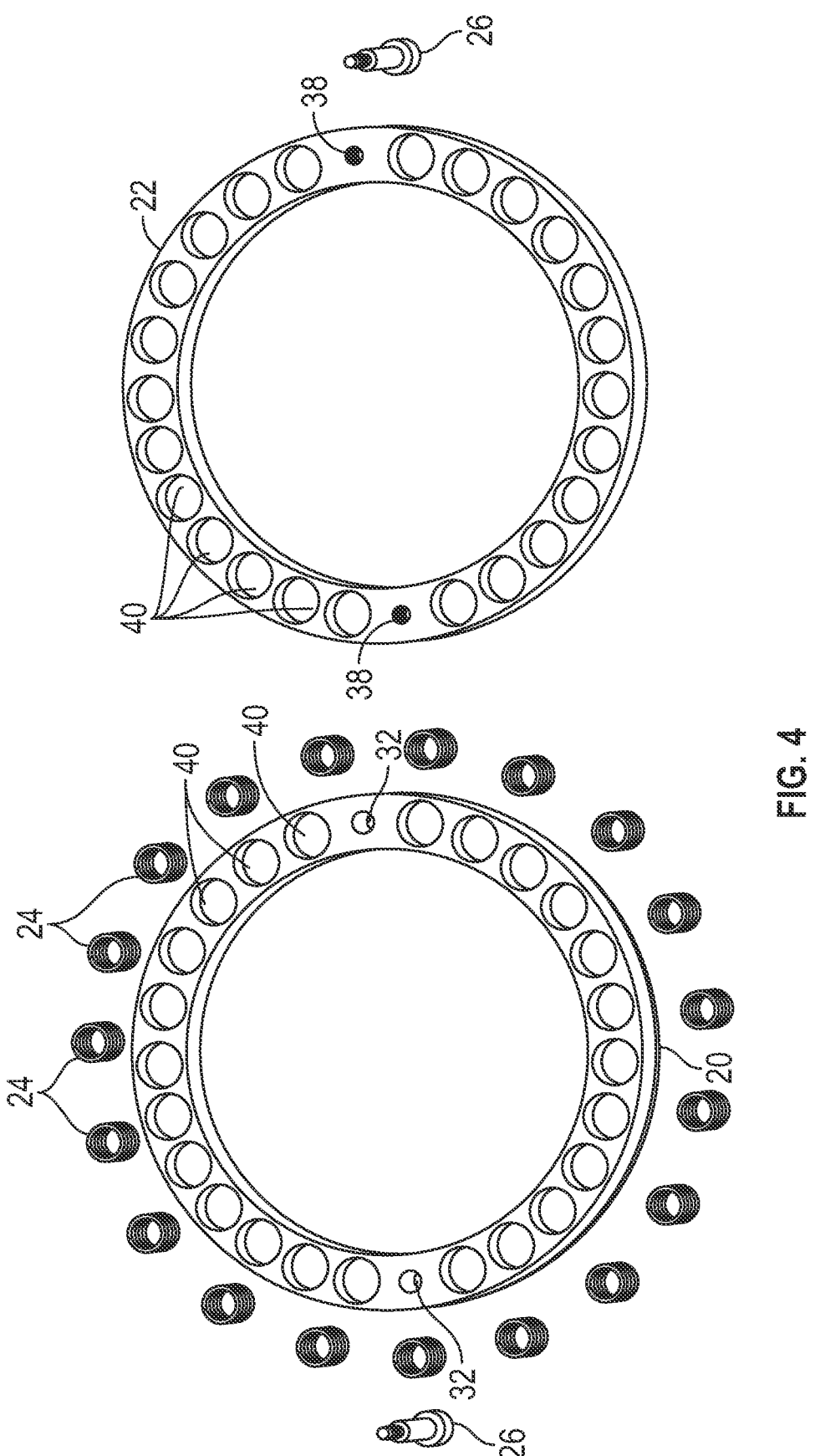
FIG. 4 is an exploded plan view of the retainer rings and shoulder bolts, and showing recesses of the rings.
Figure 5:
FIG. 5 is a plan view of the disassembled ring showing the opposite sides of the rings from FIG. 4
Figure 6:
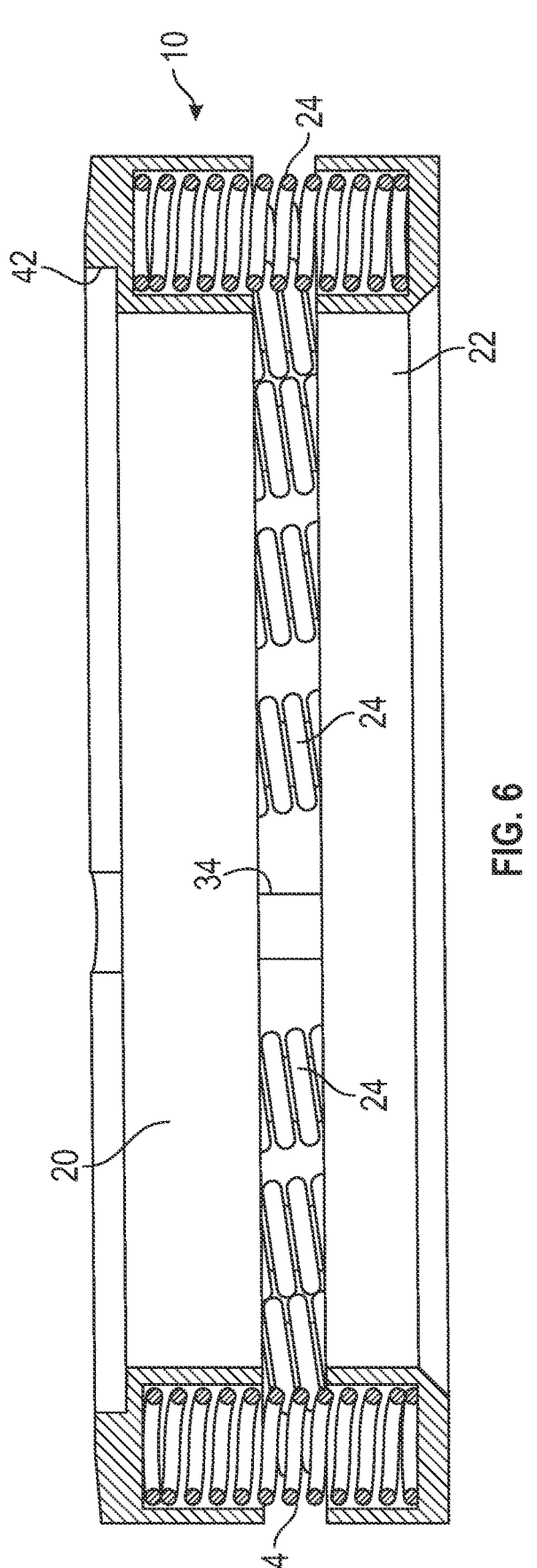
FIG. 6 is a sectional view of the spring retainer assembly taken along lines 6-6 of FIG. 3.
Figure 7:
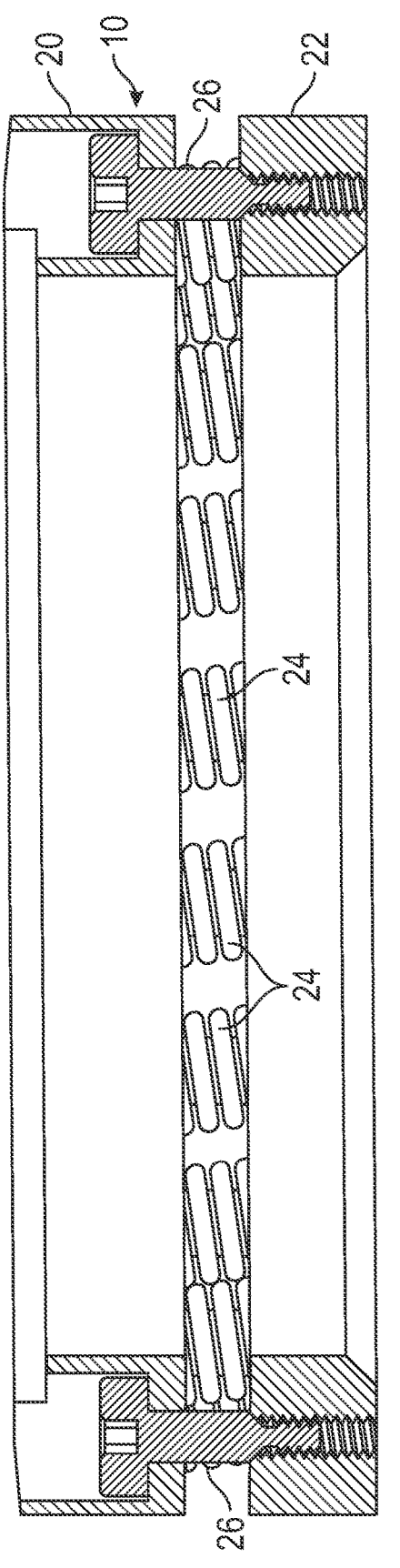
FIG. 7 is a sectional view of the spring retainer assembly taken along line 7-7 of FIG. 3.
Figure 8:
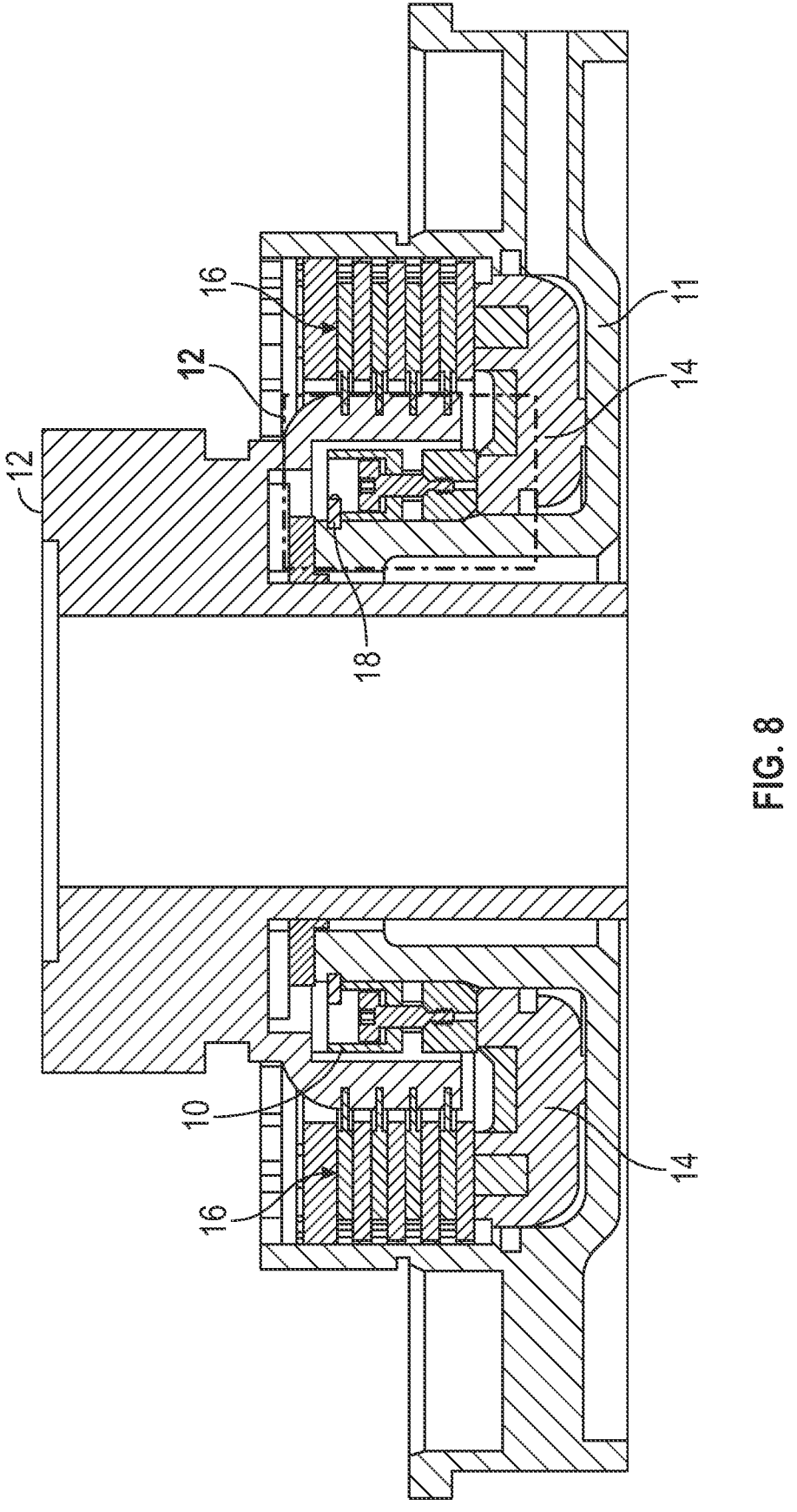
FIG. 8 is a sectional view showing the spring assembly mounted on a transmission clutch hub, and showing the shoulder bolts when the spring assembly is in a released or expanded, neutral state.
Figure 9:
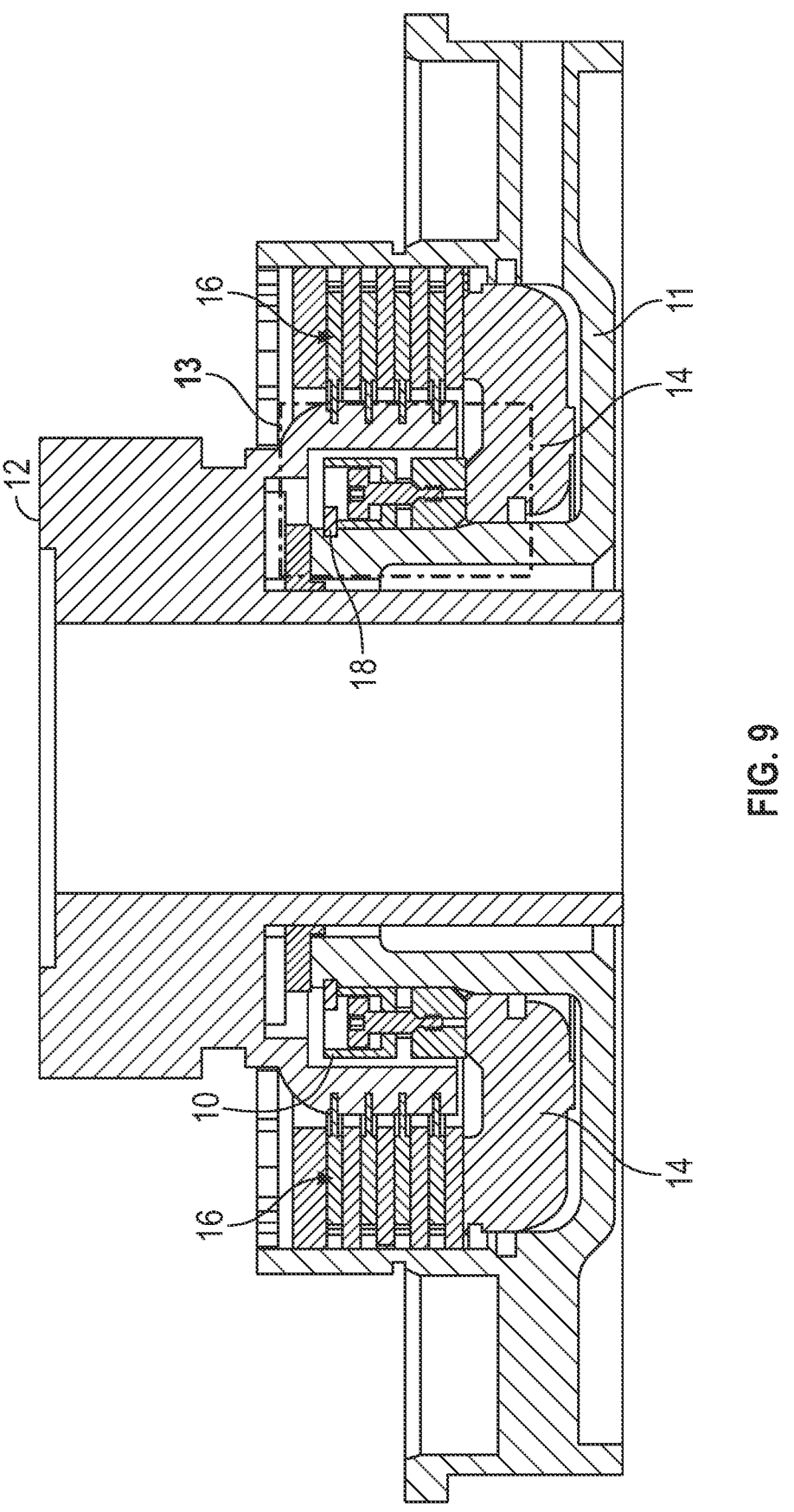
FIG. 9 is a view is a sectional view similar to FIG. 8, with the spring assembly in an applied or compressed state.
Figure 10:
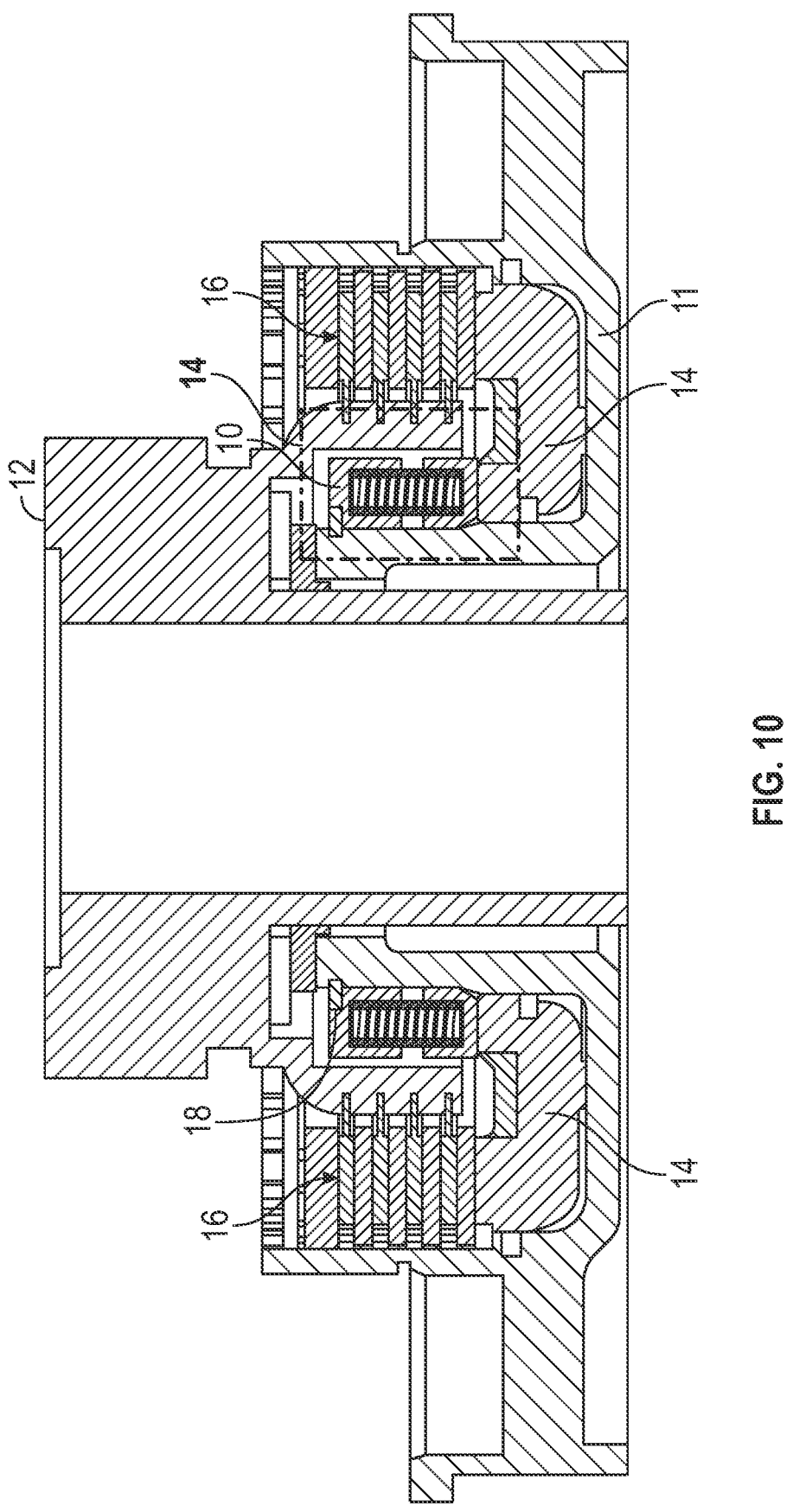
FIG. 10 is a sectional view showing the spring retainer assembly mounted on a transmission clutch hub, and showing the springs in a released, neutral state.
Figure 11:
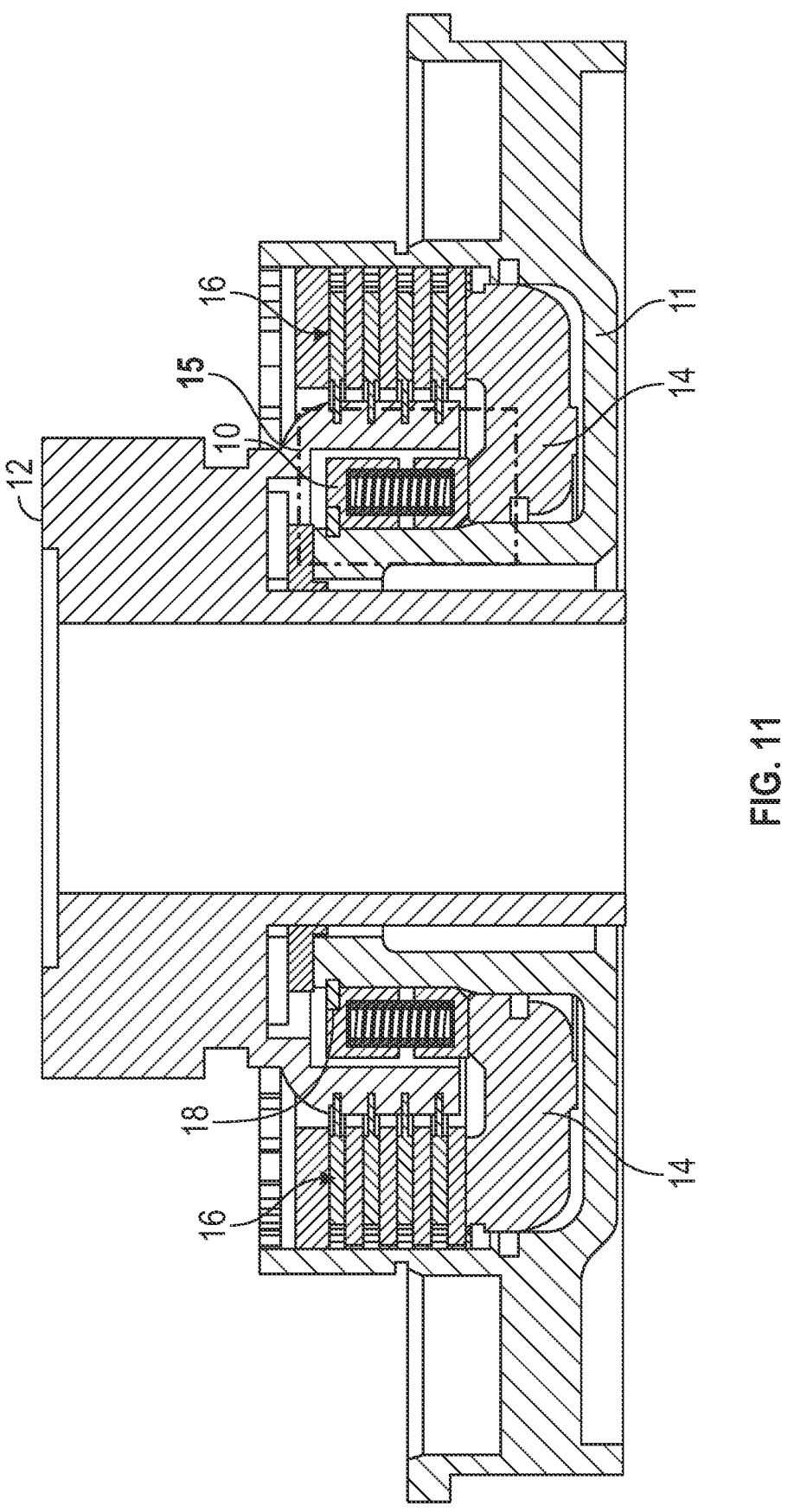
FIG. 11 is a sectional view similar to FIG. 10, with the springs in an applied, compressed state.
Figure 13:
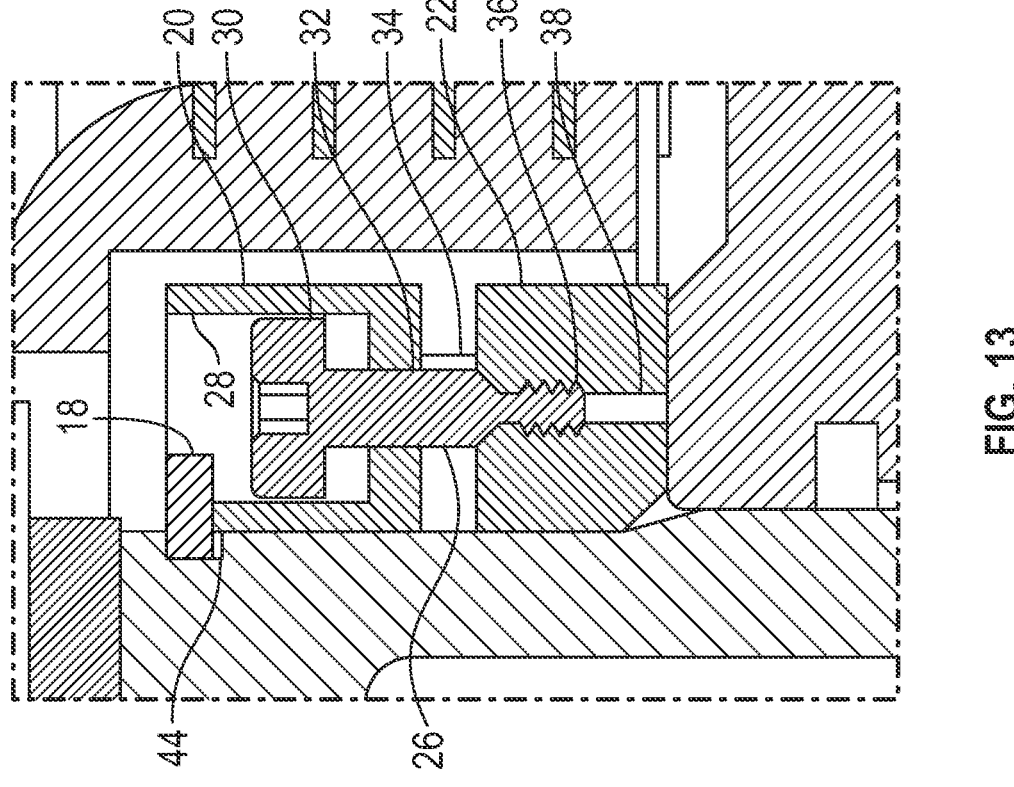
FIG. 13 is an enlarged view taken from line 13 of FIG. 9.
Figure 12:
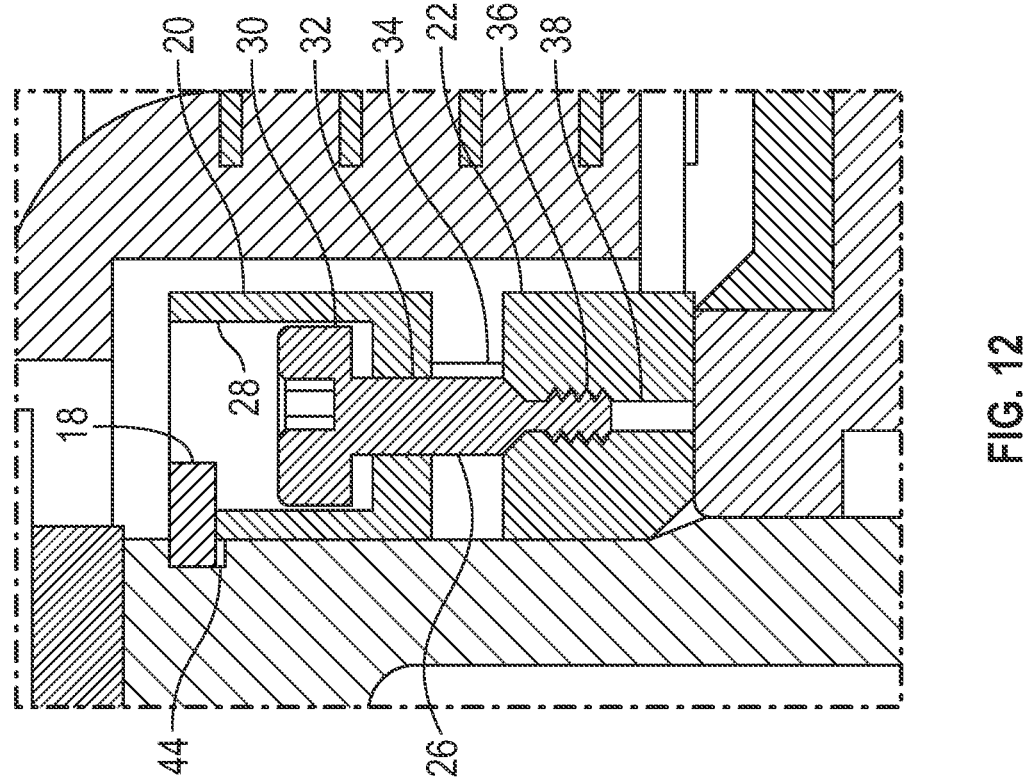
FIG. 12 is an enlarged view taken along line 12 of FIG. 8.

The spring retainer assembly 10 includes first and second, or top and bottom, annular rings 20, 22. A plurality of springs 24 are sandwiched between the rings 20, 22. The rings 20, 22 are secured together by a fastener 26, such as a shoulder bolt, which allows the rings 20, 22 to move axially relative to one another. FIG. 3 shows the use of two shoulder bolts 26, though three or more shoulder bolts can be used to connect the upper and lower rings 20, 22. Preferably, the fasteners 26 are equally spaced around the rings 20, 22. As best seen in FIGS. 12 and 13, the top ring 20 has a large diameter recess 28 to receive the head 30 of the shoulder bolt 26, and a smaller diameter hole 32 through which the unthreaded shaft 34 of the shoulder bolt extends. The lower threaded end 36 of the bolt 26 is received in a threaded hole 38 of the bottom ring 22. The bolts prevent rotation of the rings about their central axis, while allowing longitudinal axial movement of the rings relative to one another.

Each ring 20, 22 includes a plurality of recesses or pockets 40 to receive the upper and lower ends of the springs 24, respectively. The number of springs 24 and recesses 40 may be more or less than that is shown in the drawings. Preferably, the springs 24 and recesses 40 are spaced equally around the top and bottom rings 20, 22.

Figure 15:
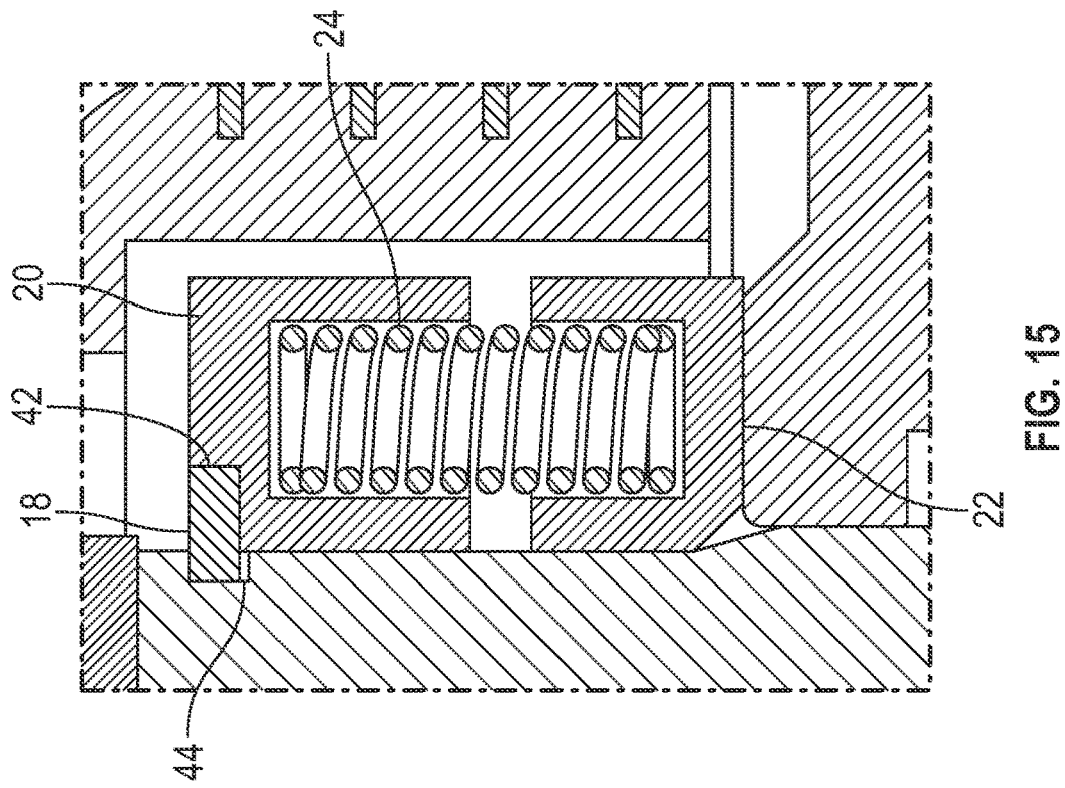
FIG. 15 is an enlarged view taken along line 15 of FIG. 11.
Figure 14:
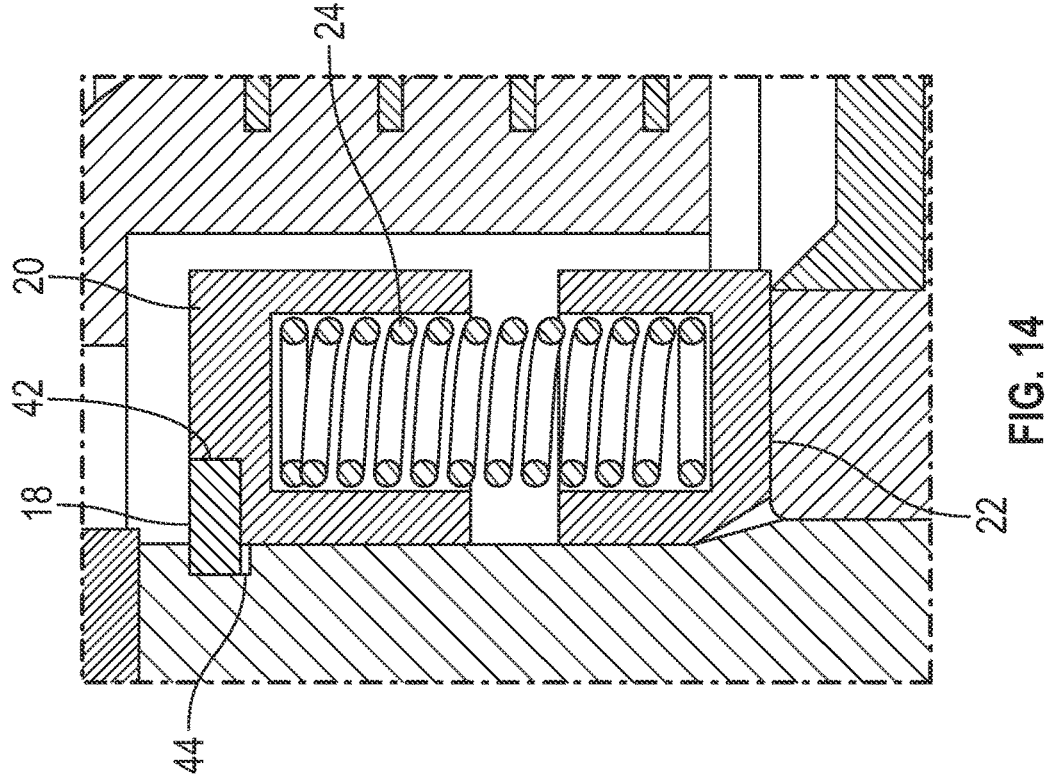
FIG. 14 is an enlarged view taken along line 14 FIG. 10.

As best seen in FIGS. 14 and 15, the top ring 20 has a notch 42 formed on the upper, inner peripheral edge to contain the retaining ring 18. The clutch housing 11 also has a groove 44 into which the retaining ring 18 extends. In the preferred embodiment, the ring 18 is tight to the inner diameter of the groove 44, and the top of the spring assembly creates a fence around the ring 18 to prevent any outward movement of the ring, such that the retaining ring 18 is secured in the groove 14. Thus, the retaining ring 18 cannot pop out of the assembly 10, as in OEM spring assemblies. While the drawings show the rings 20, 22 and springs 24 being pre-assembled as a unit to be installed on the piston, in another embodiment, one of the rings may be attached to the piston, or formed into the piston, before the springs and second ring are assembled onto the first ring.

In operation, when the clutch piston 14 is in the released state such that the clutch is disengaged, the springs 24 of the assembly 10 are at rest, or decompressed, as shown in FIGS. 8, 10, 12 and 14. When the clutch piston 14 is applied to engage the clutch, the bottom or second ring 22 is moved toward the top or first ring 20 so as to compress the springs 24, as seen in FIGS. 9, 11, 13, and 15. When the clutch is to be disengaged, the spring assembly 10 urges the piston 14 back to the released state or condition. Thus, when the clutch activating force is applied, spring assembly 10 is compressed, and when the clutch activating force is released, the spring assembly 10 is expanded. The space between the top and bottom rings 20, 22 is decreased when the springs 24 are compressed and is increased when the springs 24 expand. In the preferred embodiment, the top ring 20 is stationary, and the lower ring 22 is movable. The shoulder bolts 26 guide the movement of the bottom ring 22 relative to the top ring 20 during compression and expansion, while preventing turning or rotation of the rings. The recesses 40 of the rings 20, 22 prevent roll over of the springs.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art. It is understood that "top" and "bottom" are relative terms used to describe the drawings, and do not limit the orientation of the clutch and/or the spring assembly in use.

What is claimed is:

1. A spring assembly for a clutch of an automatic transmission, comprising:
   a first ring;
   a second ring;
   a plurality of springs sandwiched between the first and second rings;

the first and second rings each having recesses surrounding opposite ends of the springs so as to contain the springs between the first and second rings;
   threaded fasteners coupling the first and second rings together and allowing the rings to move axially relative to one another; and
   the rings being movable between an expanded position when the springs are in a neutral position and a compressed position when the springs are compressed.

2. The spring assembly of claim 1, wherein the fasteners are shoulder screws.

3. The spring assembly of claim 1, wherein each of the springs is retained between the rings without any structure extending into the spring.

4. The spring assembly of claim 1, wherein the rings are operatively connected to a piston of the clutch.

5. The spring assembly of claim 1, wherein the recesses are spaced apart from one another and extend 360° around the rings.

6. The spring assembly of claim 1, wherein the recesses are a series of circular recesses each having a diameter to receive one of the ends of the springs.

7. The spring assembly of claim 1, wherein the springs normally bias the first and second rings apart.

8. The spring assembly of claim 1, wherein the ends of the springs reside within the recesses of the first and second rings, respectively.

9. The spring assembly of claim 1, wherein the first and second rings, alone, engage the springs to retain the springs in aligned orientations.

10. The spring assembly of claim 1, wherein the first ring has a lower surface and the recesses extend upwardly from the lower surface, and the second ring has an upper surface, and the recesses extend downwardly from the upper surface.

11. The spring assembly of claim 1, wherein the recesses have a larger diameter than the spring diameter so that the spring fits into the recess.

12. An automatic transmission having a clutch and a piston to move the clutch between engaged and disengaged positions, and the transmission further comprising:
   a spring assembly for urging the clutch to the disengaged position;
   the spring assembly having first and second rings and a plurality of springs between the rings;
   the first and second rings each having recesses;
   the springs each having opposite ends extending into the recesses to retain the springs between the rings; and
   fasteners slidably extending through one of the rings and threadably extending into the other of the rings so as to connect the rings and allow axial movement of the rings relative to one another as the springs are compressed and decompressed.

13. The automatic transmission of claim 12, wherein the springs urge the rings axially outwardly.

14. The automatic transmission of claim 12, wherein the recesses are spaced circumferentially around each ring.

15. The automatic transmission of claim 12, wherein the rings each have a planar inner surface and the recesses of the rings extend in opposite axial directions from the inner surfaces.

16. The automatic transmission of claim 12, wherein the fasteners are shoulder bolts.

17. The automatic transmission of claim 12, wherein the recesses have a diameter larger than diameters of the springs.

18. The automatic transmission of claim 12, wherein the springs are retained between the rings without any structure extending into the springs.

\* \* \* \* \*